United States Patent [19]

Bock et al.

[11] 4,014,831

[45] Mar. 29, 1977

[54] NOVEL IONIC POLYMER COMPOSITIONS

[75] Inventors: Jan Bock, Piscataway; Neville G. Thame, Edison, both of N.J.; Lowell Westerman, Baytown, Tex.

[73] Assignee: Exxon Research and Engineering Company, Linden, N.J.

[22] Filed: May 21, 1975

[21] Appl. No.: 579,496

[52] U.S. Cl. .................. 260/23 H; 260/23 AR; 260/23 S; 260/23.7 B; 260/23.7 R

[51] Int. Cl.$^2$ .................................... C08F 8/42

[58] Field of Search .... 260/79.3 R, 23 AR, 23.7 B, 260/23.7 R, 23 H, 23 S

[56] References Cited

UNITED STATES PATENTS

| | | | |
|---|---|---|---|
| 3,642,728 | 2/1972 | Canter | 260/79.3 R |
| 3,903,039 | 9/1975 | Gobarty et al. | 260/79.3 R |

*Primary Examiner*—V.P. Hoke
*Attorney, Agent, or Firm*—R. Baran; R. E. Nanfeldt

[57] ABSTRACT

The instant invention relates to a method for making processable ionic polymer compositions which are characterized as being processable at high temperatures, for example, 200° C, while retaining adequate physical properties at both room temperatures and elevated temperatures which are below the processing temperature, for example, up to 100° C and more. In this method, an ionic polymer comprising an elastomeric or plastic backbone and pendant acid groups is combined with a first neutralizing agent having two components. One component of said neutralizing agent is a metal or ammonium type moiety which combines with the pendant acid groups as a metal or ammonium salt thereof; the other component of neutralizing agent takes up the hydrogen ion present in the pendant acid groups and is converted into a preferential plasticizer for said ionomer. The preferential plasticizer acts to disrupt the ionic association of the metal or ammonium salt groups, thus allowing the ionic polymer to act as a noncrosslinked material. When the composition is in this state, it can be compounded with oils, fillers, etc. An ionic composition in this state is also characterized as having poor physical properties, for example, tensile strength, and excellent processing characteristics, e.g., low viscosity at elevated temperatures. This neutralized composition is then contacted with a second neutralizing agent which acts to substantially convert said preferential plasticizer to a higher melting species, for example, a salt. The composition, after the second neutralizing step, is then characterized as having the desired properties, for example, excellent physical properties at room temperature and up to 100° C and more than adequate processability at temperatures of from 200° C and above. Preferably, the ionic polymer is an ionic elastomer having from 0.2 to 25 mole % pendant acid groups, for example, carboxylic, phosphonic and sulfonic acid groups. Preferably, the pendant acid groups are sulfonic acid groups.

The first neutralizing agent is preferably selected from the group consisting of metal salts of fatty acids wherein said metal is selected from Groups IA, IIA, IIB, IIA, Al and Pb of the Periodic Table of the Elements or ammonium salts of fatty acids said ammonium moiety has the general formula R$_4$N wherein R is selected from the group consisting of hydrogen and lower alkyl, e.g., methyl and ethyl, more preferably hydrogen radicals.

The second neutralizing agent is preferably selected from the group consisting of Group IA, IIA and IIB derivatives of lower organic acids, for example, from 1 to 4 carbon atoms and their hydroxides. Preferably, the first neutralizing agent is combined with said ionic polymer at from 0.5 equivalents/equivalent of acid to 5 equivalents/equivalent acid and more preferably from 1 equivalent/equivalent acid to 3 equivalents/equivalent acid and said second neutralizing agent is combined with said ionic polymer preferably at from 0.25 equivalent/equivalent acid to 3 equivalents/equivalent acid, and more preferably between 0.75 equivalent/equivalent acid and 3 equivalents/equivalent acid.

25 Claims, No Drawings

NOVEL IONIC POLYMER COMPOSITIONS

FIELD OF THE INVENTION

The instant invention invention relates to a method for making processable ionic polymer compositions which are characterized as being processable at high temperatures, for example, 200° C, while retaining adequate physical properties at both room temperatures and elevated temperatures which are below the processing temperature, for example, up to 100° C and more. In this method, an ionic polymer comprising an elastomeric or plastic backbone and pendant acid groups is combined with a first neutralizing agent having two components. One component of said neutralizing agent is a metal or ammonium type moiety which combines with the pendant acid groups as a metal or ammonium salt thereof; the other component of neutralizing agent takes up the hydrogen ion present in the pendant acid groups and is converted into a preferable plasticizer for said ionomer. The preferential plasticizer acts to disrupt the ionic association of the metal or ammonium salt groups, thus allowing the ionic polymer to act as a noncrosslinked material. When the composition is in this state, it can be compounded with oils, fillers, etc. An ionic composition in this state is also characterized as having poor physical properties, for example, tensile strength, and excellent processing characteristics, e.g., low viscosity at elevated temperatures. This neutralized composition is then contacted with a second neutralizing agent which acts to substantially convert said preferential plasticizer to a higher melting species, for example, a salt. The composition, after the second neutralizing step, is then characterized as having the desired properties, for example, excellent physical properties at room temperature and up to 100° C and more than adequate processability at temperatures of from 200° C and above. Preferably, the ionic polymer is an ionic elastomer having from 0.2 to 25 mole % pendant acid groups, for example, carboxylic, phosphonic and sulfonic acid groups. Preferably, the pendant acid groups are sulfonic acid groups.

The first neutralizing agent is preferably selected from the group consisting of metal salts of fatty acids wherein said metal is selected from Groups IA, IIA, IIB, IIA, and IVA of the Periodic Table of the Elements or ammonium salts of fatty acids said ammonium moiety has the general formula $R_4N$ wherein R is selected from the group consisting of hydrogen and lower alkyl, e.g., methyl and ethyl, more preferably hydrogen radicals.

The second neutralizing agent is preferably selected from the group consisting of Group IA, IIA and IIB derivatives of lower organic acids, for example, from 1 to 4 carbon atoms and their hydroxides. Preferably, the first neutralizing agent is combined with said ionic polymer at from 0.5 equivalents/equivalent of acid to 5 equivalents/equivalent acid and more preferably from 1 equivalent/equivalent acid to 3 equivalents/equivalent acid and said second neutralizing agent is combined with said ionic polymer preferably at from 0.25 equivalent/equivalent acid to 3 equivalents/equivalent acid, and more preferably between 0.75 equivalent/equivalent acid and 3 equivalents/equivalent acid.

BACKGROUND OF THE PRIOR ART

U.S. Pat. No. 3,642,728 relates to sulfonated polymer compositions wherein the sulfonate group may be combined with a counterion which is the cation of a neutralization agent. In this patent, the desirability of using mixed salts of stearic acid as neutralization agents is suggested but no specific combinations, nor the results obtained therewith are described.

This patent also suggests combined the compositions disclosed therein with various other polymers including polyolefins. However, in the description of the blends of the polymers described in the patent with the polyolefins, it is suggested that the polyolefin constitutes a major portion of said blend.

In U.S. Pat. Application Ser. No. 103,902, filed on Jan. 4, 1971, in the names of N. H. Canter et al., processable ionomers are described which comprises an ionomer in combination with a preferential plasticizer. These materials are prepared by a one-step or two-step neutralization process. However, where the two-step neutralization is taught, the process of neutralization is carried out directly opposite to that described in the instant specification, that is, the ionomer precursor, e.g., the acid form, is contacted with a strong base, e.g., sodium hydroxide which yields an intractable polymer. This material is then combined with a preferential plasticizer which may be a fatty acid derivative of a Group IIA or IIB metal. When the compositions are made in this manner, facile blending is not possible after the first neutralization step. Furthermore, the final product does not have the excellent balance of physical properties at room and elevated temperatures in combination with the ease of processability of the compositions taught in the instant disclosure.

SUMMARY OF THE INSTANT INVENTION

The instant invention relates to a method for making ionomeric compositions having good processability in combination with good physical properties at both room and elevated temperatures. In this process a polymer comprising an elastomeric or plastic backbone having pendant acid groups, for example, carboxylic acid, phosphonic acid, sulfonic acid groups is contacted serially with (1) is first neutralizing agent having two components, one component of which comprises a metallic or ammonium cation which combines with the pendant acid group as a metal or ammonium salt thereof and a second component which combines with the hydrogen ions present in said pendant acid groups to form a perferential plasticizer which acts to disrupt the ionic association of the metal or ammonium salt groups, and (2) a second neutralizing agent which converts said perferential plasticizer into a less active form, i.e., a salt having a substantially higher melting point than the preferential plasticizer, whereby a composition having good physical properties at both room and elevated temperatures and excellent processability at temperatures near and above the melting point of the salt of the preferential plasticizer is obtained.

The ionic polymer may comprise from 0.2 to 25 mole % pendant acid groups in its acid form. More preferably, the ionic polymer will comprise from 0.5 to 10 mole % acid groups. Preferably, the ionic polymer will have an elastomeric backbone, for example, butyl rubber, polybutadiene, ethylene propylene terpolymer, etc. In general, the compositions taught in U.S. Pat. No. 3,642,728 herein incorporated by reference, in their acid forms, are the preferred ionic polymers for use in the process of the instant invention.

Ionic plastics useful in the instant invention may be selected from the group consisting of those having a polystyrene, polyethylene, polypropylene, etc. backbone. Preferably, the ionic plastic is a polystyrene sulfonic acid polymer.

The first neutralizing agent may be selected from the group consisting of Group IA, IIA, IIB, IIIA, (see page B-3, Handbook of Chemistry and Physics, Chemical Rubber Publishing Company, 4th Ed.) or ammonium derivatives of fatty acids, that is, fatty acids having from 10 to 30, preferably from 14 to 22, carbon atoms, for example, magnesium laurate, magnesium stearate, zinc laurate, zinc stearate, barium laurate, barium stearate, alumina stearate, ammonium stearate, tetramethylammonium laurate, etc. This material is combined with the acid form of the ionic polymer at a level of from 0.5 equivalents/equivalent acid to 5 equivalents/equivalent acid groups, preferably from 1 equivalent/equivalent acid to 3 equivalents/equivalent acid. This combination, which comprises neutralization of the acid form or the ionic polymer may be carried out neat or in solution, preferably the polymer will be dissolved in a solvent.

It is important to neutralize a sufficient number of acidic groups such that the resulting composition possesses sufficient thermal stability as to allow subsequent compounding operations. The required number of acidic groups which must be neutralized will depend on the type of neutralization agent employed, the concentration of acidic groups in the polymer, and the temperature history the material will be subjected to during compounding. For example, oil extension at relatively low temperature (~50° C) can be accomplished with approximately 50% of the acidic groups neutralized while plastic blending involving a fluxing operation at 150° to 175° C would require essentially complete neutralization. The valence of the cation comprising the neutralization agent is important in determining the extent of neutralization. For example, a neutralizing agent comprised of a monovalent cation such as sodium stearate can form only one neutralized species upon completion of the reaction with the acidic groups in the polymer. Thus, one equivalent of neutralization agent per equivalent of acidic groups would be identical to one mole of agent per mole of acidic groups. One equivalent of divalent neutralization agent per equivalent of acidic groups would be one-half mole of divalent metal stearate per mole of acidic groups. A neutralization agent comprised of a divalent cation, such as magnesium stearate, can form two neutralized species upon completion of the reaction with the acidic groups in the polymer. For example, in the case of sulfonic acid groups in the polymer with magnesium stearate as the neutralization agent, a sulfonate-magnesium-carboxylate species as well as a sulfonate-magnesium-sulfonate species can be formed. If the latter species was produced complete neutralization would be effected; however, if the former species was produced on one-half neutralization would be effected. In a polymeric system due to steric constraint of the acidic site it is theorized that both species are present to some extent and thus the equivalents level may not determine the extent of neutralization; however, the skilled artisan can determine whether the correct degree of neutralization is obtained by functional measurement, e.g., of heat stability at 200° C.

It is critical that the neutralization agent be selected so as to neutralize the acid groups of the polymer to form a metal or ammonium salt thereof and also provide a preferential plasticizer for the neutralized metal or ammonium salt groups formed. Preferential plasticization of materials of this sort have been described in U.S. Ser. No. 103,902 cited above and herein incorporated by reference. The teachings of that patent application are applicable to this step of the instant method. Any material that can be converted during the neutralization of the acid form of the ionic polymer into the preferential plasticizer described in that application and additionally comprises a metal ion which can be combined in the salt form of the polymer is within the scope of this method. Further, a two-component mixture comprising, for example, a preferential plasticizer and a neutralizing agent which is not converted into a "permanent" (i.e., one that cannot be functionally removed by physical methods, e.g., volatilization at temperatures of less than about 150° C) preferential plasticizer during neutralization may also be used in this first neutralization step. For example, magnesium hydroxide and stearic acid can be combined to carry out the first neutralization step. In this case water will be formed which acts as a preferential plasticizer but will be volatilized at a later stage. In is critical, however, that after the first neutralization step is completed an ionomeric composition which comprises at least 50% of the pendant acid groups in a neutralized form, that is, in combination with a metal or ammonium counterions and a preferential plasticizer for the neutralized groups be present in the composition in an amount effective to disrupt the ionic association of the ionic polymer and thus allow the polymer to behave as an uncrosslinked material. In this state, the polymer will be easily combined with fillers, oils and other polymeric materials, for example, other nonionic plastics. An ionic polymer in this combination, that is compounded with sufficient preferential plasiticizer to allow facile flow of the polymer at reasonable processing temperatures, e.g., up to 200° C, may be designated a processable ionic polymer composition. In its broadest scope, the process of the instant invention contemplates converting processable ionic polymer combinations of this sort which are known in the art to have poor to mediocre physical properties into compositions showing improved physical properties while maintaining a substantial degree of processability.

In an especially preferred embodiment of the instant invention, the ionic polymer composition will be combined at this point with a crystalline polyolefin. The crystalline polyolefin is combined in a minor amount based on the total blend, for example, the ratio, by weight, of crystalline polyolefin to ionic polymer is from 0.05 to 1, more preferably from 0.2 to 0.80. The polyolefin is characterized as having a degree of crystallinity of at least 25%, preferably at least 40%, as measured by x-ray diffraction techniques. The crystalline polyolefin may be prepared by polymerization of alpha olefins. It is known in the art, for example, that $C_2$ to $C_8$ alpha olefin polymers may be prepared in a crystalline form. The most preferred crystalline polyolefins are polyethylene and polypropylene. These materials will be characterized as having a molecular weight of at least 2,000, preferably at least 10,000, and more preferably at least 20,000. The polyolefin may comprise minor amounts of other monomers, for example, vinyl acetate, methyl acrylate, ethyl acrylate, methyl methacrylate, ethyl methacrylate, etc. Preferably, the crystalline polyolefin will comprise greater than 90% by weight of alpha olefin units.

Both high and low density polyethylene may be used in preparing the compositions of the instant invention, for example, polyethylenes having a density of from 0.91 to 0.97 g/cc are generally included. Polypropylene of either intermediate or high density is also within the scope of the instant invention. These materials will have a density of from 0.88 to 0.925 g/cc. Polyethylene and polypropylene can also be combined in a copolymer so long as an adequate degree of crystallinity is obtained in said combination. Thus, block polymers wherein polyethylene or polypropylene are present in crystalline form are effective.

Another less preferred material which can be utilized in place of or blended with crystalline polyolefin is trans-1,4-polybutadiene.

As stated above, the preferred ionic polymer is the sulfonic acid having a polybutyl or an ethylene-propylene terpolymer backbone. Examples of ethylene-propylene terpolymers include the polymerization product of ethylene-propylene and a nonconjugated diene, said diene having a molecular weight of less than 400, e.g., 1,6-hexanediene, ethylidenenorbornene, etc. These materials may comprise from 45 to 90% ethylene and 10 to 55% propylene and from 2 to 10% of the termonomer. The sulfonated derivatives of polymers comprising ethylene and a nonconjugated diene or propylene and a nonconjugated diene, such as ethylidenenorbornene (ENB), e.g., from 2 to 10 weight % ENB may be also used as ionic polymers in the process of the instant invention. The above materials are generally prepared by sulfonation, using the techniques described in U.S. Pat. No. 3,642,728 noted above. These materials are unstable, to a large extent, and must be neutralized prior to isolation. After the first neutralization step described above, the material may be subjected to conventional elastomer finishing operations, such as steam stripping to remove hydrocarbon solvent and dewatering or drying in a high temperature volatilization extruder. The product which has undergone the first neutralization step is characterized as having quite low viscosities as elevated temperatures, for example, temperatures of from 125° C to 200° C, yet have excellent green strength at room temperature. These materials which are substantially similar to those described in U.S. Pat. Application No. 103,902 described above are deficient in their physical properties, for example, tensile strength, at elevated tempertures, i.e., 100° C and above. At this point, the compositions are also sensitive to water and are deficient in resistance to bloom or surface exudation when molded objects are prepared from these materials.

Thus, the instant method contemplates a second neutralization step wherein a neutralization agent is contacted with the above-described material at conditions whereby the preferential plasticizer is converted into a material that is no longer capable of disrupting the ionic associations at temperatures of less than about 150° C. For example, the preferential plasticizer is converted into a salt having a higher melting point, i.e., >150° C. The second neutralization agent is preferably selected from the group consisting of the hydroxides and lower alkoxides and alkanoates of Group IA, IIA and IIB metals. These materials convert the preferential plasticizer which, as described above, is preferably a fatty acid into its respective salt. The anion of these second neutralization agents, which is hydroxide or lower alkanoate or alkoxide, for example, $C_1$ to $C_6$ alkanoates and alcoholates, are converted to water, the corresponding alkanoic acid or alcohol, respectively, during the second neutralization step and may be removed from the composition by volatilization. These materials is left behind may also act to disrupt ionic associations and thus the desired results contemplated in the method of the instant invention may not be obtained.

The second neutralization step may be carried out either in solution or preferably in bulk. Either in solution or bulk, the sequence of events must be as follows. First, the acid form of the polymer is combined with the first neutralization agent generating the preferential plasticizer. The resulting system, if desired, is then combined with the compounding additives (plastics, mineral fillers, oil extenders, carbon black, etc.). And lastly, the second neutralization agent is introduced. The preferred method of incorporation involves the use of conventional batch or continuous mixing devices used in the rubber and plastics industry. With a batch mixer such as a Banbury the ionic polymer containing the first neutralization agent is combined with the compounding ingredients and then the second neutralization agent is added. This incorporation of the second neutralization agent is a chemical reaction, the extent of which will depend on the time, temperature and shear employed. It may be advantageous to control the extent of reaction to yield a partial neutralization. This may be accomplished by controlling the time, temperature, the shear history of the mixing operation.

For reasons of economy, the second neutralization agent is preferably a hydroxide.

Preferably, the second neutralization agent is a Group IIA hydroxide, more preferably $Mg(OH)_2$.

The second neutralization step is selected to form a salt of the preferential plasticizer which has a higher melting point than the preferential plasticizer, and thus will function only at a higher temperature. The salt will have a melting point of at least 10° C, more preferably at least 50° C, higher than the preferential plasticizer.

It will be appreciated by the skilled artisan that the lower melting ammonium and metal salts of fatty acids, e.g., ammonium laurate, zinc stearate, etc., which have melting points of 100° C and 130° C respectively may be used as preferential plasticizers which are effective at temperatures of less than 150° C. After compounding these low melting preferential plasticizers may be converted to higher melting salts by combination with, for example, a Group IIA hydroxide or lower alkanoate, e.g., $Mg(OH)_2$. The skilled artisan may thus, by selection of the salt which will remain after the second neutralization step, design an ionic polymer composition having processability at any temperature at or above the melting point of said salt.

The second neutralization agent is combined with the neutralized ionic polymer at a level of from 0.25 equivalents/equivalent of acid group to 10 equivalents/equivalent of acidic groups, preferably from 0.25 to 5. When the first neutralization agent is an ammonium derivative, it generally is desirable to use higher amounts of the second neutralization to displace the ammonium ions that have combined with the acid groups of the ionic polymer with metal cations. The metal cations, especially the divalent cations, form ionic groups which are more strongly associated, thus provide a tightly crosslinked polymer.

It is critical that at least 25% of the preferential plasticizer is converted into a higher melting salt. This salt, as stated above, is not a preferential plasticizer at the lower temperatures utilized in compounding, etc. That is, at from room temperature up to 100° C and somewhat above, the salt of the preferential plasticizer should be ineffective for disrupting the ionic associations. The material after the second neutralization step will behave as a crosslinked material at temperatures up to and including 150° C, thus the physical properties of these doubly neutralized materials are outstanding at temperatures in this range. However, it is desirable that the materials even after a second neutralization step should be processable at temperatures of 200° C and above. Thus, the salt of the preferential plasticizer is preferably selected to disrupt ionic associations at temperatures of from about 50° below to 50° above the temperature at which it is desired to fabricate these doubly neutralized materials.

It has unexpectedly been found that these doubly neutralized materials show excellent processing properties at high temperatures while retaining excellent physical properties at temperatures of up to 100° C. These materials behave as if only the second neutralizing agent is acting at lower temperatures, and the first neutralizing agent, only, is working at elevated temperatures, e.g. > 200° C. That is, if the ionic polymers described above were neutralized only with the second neutralizing agent, excellent physical properties would be obtained at room temperature and up to 100° C. However, processability would suffer. When the ionic polymers are neutralized with the first neutralization agent only, excellent processability is obtained, but poor physical properties at elevated temperatures, e.g., 100° C, are obtained.

The doubly neutralized materials prepared by the method of the instant invention have both properties, thus giving the polymer fabricator the best balance of properties, i.e., processability and physical properties.

The doubly neutralized materials prepared by the instant method also have the following unexpected advantages: improved water sensitivity, and resistance to bloom or surface exudation.

The following are specific embodiments of the instant invention, which demonstrate the above advantages of the doubly neutralized ionic polymers.

EXAMPLE 1

Effect of $Mg(OH)_2$ addition on physical properties, rheology and water sensitivity of sulfonated ethylene-propylene-ethylidene norbornene terpolymer (sulfonated EPT) blended with a crystalline polyethylene.

A sulfonated EPT neutralized with 3 equivalents zinc acetate - 3 equivalents stearic acid was blended with 35% high density polyethylene (HDPE) at 150° C using a Brabender extruder mixing head. In one case (A), no $Mg(OH)_2$ was added. In the second case (B), 1 equivalent $Mg(OH)_2$ (based on equivalents of stearic acid) was added in the mixing head and in the third case (C), 2 equivalents $Mg(OH)_2$ added.

| Sample | Sulfonate, g | HDPE, g | $Mg(OH)_2$, g |
|--------|--------------|---------|---------------|
| A | 32.5 | 17.5 | 0 |
| B | 32.5 | 17.5 | 0.66 |
| C | 32.5 | 17.5 | 1.32 |

Each blend was removed from the mixing head after 5–6 minutes and milled on a 3-inch electric mill at 150° C for 3-½ minutes.

Rheology was obtained at 200° C using the milled sheet.

Micropads (20 mil) were pressed (preheated mold, 3 feet preheat, 4 feet press at 20 tons, cooled under 20 tons) and used to obtain stress-strain at 23° C and 100° C and water sensitivity in distilled water at 50° C.

Rheology Insron Capillary Rheometer, 0.050 inch × 1.0 inches die, 200° C

As shown in Table I, shear stress increases with the addition of $Mg(OH)_2$. Melt fracture drops from 1469 $sec^{-1}$ with no $Mg(OH)_2$ to 147 $sec^{-1}$ with $Mg(OH)_2$

TABLE I

| Sample | Shear Stress, dynes/cm² × 10⁻⁵ | | | | Melt Fracture |
|--------|---|---|---|---|---|
| | $0.75\ sec^{-1}$ | $7.4\ sec^{-1}$ | $74\ sec^{-1}$ | $740\ sec^{-1}$ | Shear Rate, $sec^{-1}$ |
| A (No $Mg(OH)_2$) | 0.94 | 3.6 | 11.3 | 30.0 | DEF at 1469 |
| B (1 Eq $Mg(OH)_2$) | 2.5 | 8.7 | 26.1 | Pulsates | DEF at 147 |
| C (2 Eq $Mg(OH)_2$) | 3.7 | 11.4 | 27.9 | 55.4 | SI at 73, DEF at 147 |

TABLE II

Tensile - Elongation of $Mg(OH)_2$ Neutralized Blends of Polyethylene and Sulfo-EPT Stress-Strain Instron Crosshead Speed 2 In. Per Minute

23° C

| Sample | Tensile, psi | | | | | | Elongation % |
|--------|------|------|------|------|------|-------|---|
| | 100% | 200% | 300% | 400% | 500% | Break | |
| A (No $Mg(OH)_2$) | 816 | 856 | 902 | 1002 | — | 1091 | 458 |
| B (1 Eq $Mg(OH)_2$) | 1045 | 1232 | 1458 | 1392 | 2242 | 2522 | 547 |

100° C

| Sample | Tensile, psi | | | | | Elongation % |
|--------|------|------|------|------|-------|---|
| | 100% | 200% | 300% | 400% | Break | |
| A (No $Mg(OH)_2$) | 95 | 58 | — | — | 48 | 223 |
| B (1 Eq $Mg(OH)_2$) | 265 | 283 | 310 | 345 | 359 | 443 |
| C (2 Eq $Mg(OH)_2$) | 366 | 412 | — | — | 419 | 217 |

Table II, above, shows the effect of $Mg(OH)_2$ addition on the stress-strain properties of the plastic blended sulfonate polymer. The tensile strength increases with $Mg(OH)_2$ addition at both room temperature and 100° C. The effect of $Mg(OH)_2$ is especially evident at the elevated temperature. In addition, the processability as evidenced by the rheological data of Table I is adequate for such operations as extrusion or compression molding.

A micropad of each sample was placed in distilled water in a capped jar and held at 50° C. Periodic weighings were obtained by removing the pad from water, blotting to remove surface water and weighing the pad quickly. As shown in Table III, the sample with no Mg(OH)$_2$ after 1488 hours has picked up 31.7% water, while the Mg(OH)$_2$ added pads pick up about 7–8% water.

It should be noted that throughout Examples 1 to 4 the sulfonated ethylene propylene terpolymer is prepared by sulfonating a polymer comprising 52% ethylene, 43% propylene, and 5% ethylidene norbornene (Mooney Viscosity of ~20) according to the method described in U.S. Pat. No. 3,642,728. The amount of sulfonate groups incorporated is 30 milliequivalents per 100 grams of polymer. The amount of neutralization agent and/or the preferential plasticizer is given in equivalents/equivalent sulfonate (sulfonic acid) group.

TABLE III

| Water Sensitivity | In Distilled Water at 50° C | | |
|---|---|---|---|
| | % Water Weight Pickup | | |
| Hours | No Mg(OH)$_2$ | 1 Eq Mg(OH)$_2$ | 2 Eq Mg(OH)$_2$ |
| 68 | 4.85 | 3.73 | 3.81 |
| 170 | 7.15 | 4.58 | 4.68 |
| 455 | 11.9 | 5.59 | 5.86 |
| 1488 | 31.7 | 7.16 | 8.05 |

Rheology Instron Capillary Rheometer, 0.050 inch × 1.0 inches die, 200° C

As shown in Table IV, a slightly higher shear stress is obtained with sample E (2.2 phr Mg(OH)$_2$) as compared to K with no change in the melt fracture point.

Water Sensitivity In Distilled Water at 50° C

Percent water pickup versus days in water at 50° C was measured. The average water pickup for the Mg(OH)$_2$ samples after about 14 days is 4.9% as compared to 7.5% for K.

TABLE IV

| | RHEOLOGY BALANCE | |
|---|---|---|
| Shear Rate sec$^{-1}$ | K Viscosity Poise | E Viscosity, Poise |
| 0.73 | 5.0 × 10$^5$ | 5.3 × 10$^5$ |
| 15 | 6.8 × 10$^4$ | 7.0 × 10$^4$ |
| 29 | 4.1 × 10$^4$ | 4.2 × 10$^4$ |
| 73 | 2.2 × 10$^4$ | 2.2 × 10$^4$ |
| 146 | 1.5 × 10$^4$ | 1.4 × 10$^4$ |
| 292 | 1.0 × 10$^4$ | 1.1 × 10$^4$ |
| 730 | Fracture | Fracture |

As shown in Table V below, the addition of Mg(OH)$_2$ to the control (K) increases modulus, i.e., tensile stress at a given elongation, at room temperature and decreases elongation. At 100° C tensile strength increases from 194 psi to 473 psi with the addition of 2.2 phr Mg(OH)$_2$ to K.

TABLE V

| 23° C | Tensile Stress psi | | | | | | |
|---|---|---|---|---|---|---|---|
| Sample | 100% | 200% | 300% | 400% | 500% | Break | Elongation % |
| K | 433 | 631 | 811 | 989 | 1107 | 1108 | 517 |
| D | 579 | 774 | 931 | | | 1020 | 360 |
| E | 575 | 787 | 974 | | | 1063 | 350 |
| F | 567 | 792 | 955 | | | 934 | 290 |

| 100° C | Tensile Strength | |
|---|---|---|
| Sample | psi | % Elongation |
| K | 194 | 545 |
| E | 473 | 350 |

Thus, Example 2 demonstrates that the process of the instant invention provides ionic polymer compositions having a good blend of physical properties and processability.

EXAMPLE 2

Effect of Mg(OH)$_2$ addition on physical properties, rheology and water sensitivity of a compounded ionic polymer composition having the following composition: 100 parts sulfonated EPT, 32 phr Mg stearate, 150 phr black, 100 phr oil) which is hereafter designated as sample K.

To three 50 g samples of K on a cold mill was added 1.1 phr, 2.2 phr and 3.3 phr Mg(OH)$_2$ (samples D, E and F respectively).

| Sample | K, gms | Mg(OH)$_2$, gms |
|---|---|---|
| D | 50 | 0.159 |
| E | 50 | 0.320 |
| F | 50 | 0.64 |

Test pads were prepared on a press (175° C, 5 min).

EXAMPLE 3

Effect of Ba(OH)$_2$·8H$_2$O addition on physical properties, rheology and water sensitivity of the control (K).

| Sample | K, g | Ba(OH)$_2$ . 8H$_2$O, g | Water, ml |
|---|---|---|---|
| G | 110 | 0.8606 (0.5 Eq) | 1.96 |
| H | 110 | 1.2049 (0.7 Eq) | 2.75 |
| I | 110 | 1.5491 (0.9 Eq) | 3.54 |

The above three sample mixes were prepared as follows. The Ba(OH)$_2$·8H$_2$O plus water were milled into K on a 3 × 8 inch two roll mill at room temperature. Each mix was then milled for 5 minutes at about 70° to 80° C and finally for 3 minutes at about 150° C.

Molded pads for rheology (70mil thick), stress-strain and water sensitivity (20 mil) were prepared (1 minute preheat, 40 minutes press at 160° C).

TABLE VI

| Rheology | Instron Capillary Rheometer 0.050" × 1.0" die, 200° C | | | | |
|---|---|---|---|---|---|
| | Shear Stress, dynes/cm² × 10⁻⁵ | | | | Melt Fracture |
| Sample | 0.74 sec⁻¹ | 7.4 sec⁻¹ | 74 sec⁻¹ | 740 sec⁻¹ | Shear Rate, sec⁻¹ |
| K | 3.1 | — | 14.6 | 40.6 | V sl at 740 Def at 1469 |
| G (0.5 Eq Ba(OH)₂ . 8H₂O) | 3.7 | — | 16.2 | 46.4 | Sl at 740 Def at 1469 |
| H (0.7 Eq Ba(OH)₂ . 8H₂O) | 4.8 | — | 19.1 | 49.5 | Sl at 295 Def at 745 |
| I (0.9 Eq Ba(OH)₂ . 8H₂O) | 5.2 | — | 18.3 | 53.4 | Sl at 147 Def at 295 |

Comparing the rheology data as shown in Table VI, it is seen that as the amount of Ba(OH)₂·8H₂O added to K is increased, a corresponding increases in shear stress and a lowering of the melt fracture point is obtained, however, the compositions are still processable by means of art recognized fabrication techniques.

In Table VII the effect on physical properties of incorporating Ba(OH)₂·8H₂O added in increasing amounts is measured. At 100° C, modules and tensile at break increases and elongation is shortened.

TABLE VII

| Stress-Strain 23° C | | | | | | | |
|---|---|---|---|---|---|---|---|
| Sample | 100% | 200% | 300% | 400% | 500% | Break | Elongation % |
| | Tensile, psi | | | | | | |
| K | 433 | 631 | 811 | 989 | 1107 | 1108 | 517 |
| G (0.5 Eq Ba(OH)₂ . 8H₂O) | 481 | 665 | 812 | 953 | — | 975 | 423 |
| H (0.7 Eq Ba(OH)₂ . 8H₂O) | 513 | 700 | 850 | — | — | 937 | 370 |
| I (0.9 Eq Ba(OH)₂ . 8H₂O) | 542 | 702 | — | — | — | 758 | 207 |
| 100° C | | | | | | | |
| Sample | 100% | 200% | 300% | 400% | 500% | Break | Elongation % |
| | Tensile, psi | | | | | | |
| K | 89 | 116 | 141 | 162 | 183 | 194 | 545 |
| G (0.5 Eq Ba(OH)₂ . 8H₂O) | 301 | 431 | 467 | 561 | — | 571 | 413 |
| H (0.7 Eq Ba(OH)₂ . 8H₂O) | 278 | 388 | 470 | — | — | 505 | 355 |
| I (0.9 Eq Ba(OH)₂ . 8H₂O) | 325 | — | — | — | — | 377 | 140 |

As shown in Table VIII, the addition of Ba(OH)₂·8H₂O as the effect of lowering the water sensitivity of K.

TABLE VIII

| | Sensitivity | In Distilled Water at 50° C | | |
|---|---|---|---|---|
| | | Water Weight Pickup | | |
| Hours | K | (0.5 Eq Ba(OH)₂ . 8H₂O) | (0.7 Eq Ba(OH)₂ . 8H₂O) | (0.9 Eq Ba(OH)₂ . 8H₂O) |
| 18.5 | 2.77 | — | — | — |
| 45.5 | 3.56 | — | — | — |
| 65 | — | 3.00 | 2.75 | 2.39 |
| 88 | — | 3.08 | 3.05 | 2.58 |
| 140 | 4.47 | — | — | — |
| 156 | — | 3.10 | 3.42 | 2.98 |

EXAMPLE 4

The following example compares a composition (C) prepared by the process of the instant invention wherein the preferential plasticizer is converted to a higher melting point salt after compounding with compositions (A and B) having the same ingredients but the ingredients are not combined in the critical sequence required by the process of the invention, that is, the preferential plasticizer is not converted to a higher melting salt after the compounding step.

Composition A 32.5 grams of a formulated Sulfo-EPT composition, 17.5 grams of HDPE, and 8.1 grams of stearic acid were blended in a Brabender mixing head for 13 minutes at 160° C and 50 rpm. This blend was placed in a rubber mill and 2.6 grams of zinc acetate were added over a one minute time period while milling at 160° C. After the zinc acetate was completely added, the total blend was milled for an additional 3½ minutes at 160° C. The Sulfo-EPT composition used in this experiment contained 30 milliequivalents of acid groups, and had been neutralized with 3 equivalents of magnesium hydroxide prior to blending. The amount of zinc acetate and stearic acid was sufficient to yield 3 equivalents of the preferential plasticizer zinc stearate.

Blend B was prepared by mixing 32.5 grams of the Sulfo-EPT composition described above with 17.5 grams of HDPE and 4.16 grams (3 equivalents) of zinc stearate on a mill at 160° for 15 minutes.

Blend C was prepared by mixing 32.5 grams of a Sulfo-EPT composition containing 30 milliequivalents of acid groups and 3 equivalents each of zinc acetate and stearic acid with HDPE (17.5 grams). Subsequently 1.98 grams (3 equivalents) of magnesium hydroxide were added to the mix. The total mix was then blended in a mixing head for 8 minutes at 160° C and 50 rpm. This composition is then milled at 160° C for 3½ minutes.

Samples were prepared from the above compositions in a manner similar to that described above. These samples were placed in an excess of distilled water, held at 50° C. After 200 hours, Sample B and C both showed about 4.5 wt. % water pickup. Sample A after immersion for the same time period showed 18% water pickup. It is theorized that Sample A wherein stearic acid was added last to the mixture had excess stearic acid which remained after the addition of zinc acetate. Thus, the preferential plasticizer was left in the composition and at the temperature, at which the water sensitivity test was run, allowed disruption of the ionic bonds and the subsequent incorporation of water. Sample B, on the other hand, wherein zinc stearate was added which is also a preferential plasticizer but which has a higher melting point than stearic acid and thus would not function at the temperature at which water sensitivity was measured did not disrupt the ionic bonds. This composition showed a much lesser degree of water pickup. Sample C, of course, which represents a composition prepared by the process of the instant invention contained magnesium stearate after the compounding. This salt has a much higher melting point than either stearic acid or zinc stearate, and thus shows low water sensitivity at 50° C. If the water sensitivity tests were carried out at 100° C, differences between Sample B and C would be evident since at temperatures in this range the zinc stearate preferential plasticizer whould act to disrupt the ionic associations of the polymer and thus decrease the water sensitivity of Sample B.

These three samples were tested for room temperature stress-strain properties. The results are given in Table IX below. Note that at room temperature stress-strain properties of all the samples are substantially equivalent. The stress-strain testing was repeated at 100° C. It is noted that Sample C which represents a composition prepared by the process of the instant invention showed greatly increased stress-strain properties at this temperature. Again, Sample A and B, having stearic acid and zinc stearate remaining in the composition to act as a preferential plasticizer at temperatures of about 100° C, showed the decreased stress-strain properties which are characteristic of a system which is not highly crosslinked, that is the ionic association of the neutralized acid groups are disrupted by zinc stearate and stearic acid at temperatures of about 100° C. See Table X below.

The three samples were tested for compression set at room temperature. This experiment was carried out in a manner similar to that described above. Note that Sample C, which represents a sample prepared by the process of the instant invention, has better compression set properties at room temperature. See Table XI below. The compression set experiment was repeated at 70° C. Again, Sample C showed improved compression set properties. See Table XII below.

The melt rheology of the three samples were measured as described above. These results are reported in Table XIII below. Note that C has a higher viscosity but is sufficiently similar to Sample A and B as to be processable by methods known in the art.

TABLE IX

Room Temperature Stress-Strain

| Sample | 100% Modulus psi | Tensile psi | Elongation % |
| --- | --- | --- | --- |
| (C) Control (Mg(OH)$_2$) last | 993 | 2615 | 637 |
| (A) Zn(OAc)$_2$-STCOOH last | 956 | 3056 | 600 |
| (B) ZnSt$_2$ last | 1003 | 2943 | 523 |

Stress-strain at room temperature comparable for all three systems

TABLE X

100° C Stress-Strain

| Sample | Yield | 100% Modulus psi | Tensile psi | Elongation % |
| --- | --- | --- | --- | --- |
| (C) Control (Mg(OH)$_2$) last | — | 254 | 303 | 330 |
| (A) Zn(OAc)$_2$-STCOOH last | 144 | 132 | 123 | 497 |
| (B) ZnST$_2$, last | 155 | 143 | 165 | 520 |

"Control" (Mg(OH)$_2$) last clearly has higher modulus and tensile at 100° C.

TABLE XI

Compression Set Room Temperature

| Sample | 30 Minutes | 24 Hours | 4 Days |
| --- | --- | --- | --- |
| (C) Control (Mg(OH)$_2$) last | 48.7 | 26.6 | 22.1 |
| (A) Zn(OAc)$_2$-STCOOH last | 56.0 | 30.3 | 24.8 |
| (B) ZnSt$_2$ last | 55.7 | 30.2 | 25.5 |

"Control" (Mg(OH)$_2$) last has lower compression set at room temperature.

TABLE XII

Compression Set 70° C

| Sample | 30 Minutes | 24 Hours |
| --- | --- | --- |
| (C) Control (Mg(OH)$_2$) last | 87 | 84.1 |
| (A) Zn(OAc)$_2$-STCOOH last | 93.8 | 91 |
| (B) ZnSt$_2$ last | 91.8 | 88.1 |

"Control" (Mg(OH)$_2$)) last shows a 5–7% lower set at 70° C.

TABLE XIII

RHEOLOGY SUMMARY SHEET

TEMPERATURE 200° C   SAMPLES MOLDED FOR 3' AT 350° F   DIE 0.050" × 1.0074" L

| Brabender Mixed Sample | Shear Stress, dynes/cm$^2$ × 10$^{-5}$ | | | | Melt Fracture Shear Rate, sec$^{-1}$ |
| --- | --- | --- | --- | --- | --- |
| | 0.74 sec$^{-1}$ | 7.4 sec$^{-1}$ | 74 sec$^{-1}$ | 740 sec$^{-1}$ | |
| A | 1.6 | 5.9 | 18.2 | 48.8 | Def. at 1469 |
| B | 2.0 | 6.6 | 21.3 | Pulsates | Def. at 735 |
| C | 3.1 | 11.6 | 32.0 | Pulsates | Sl. at 147 Def. at 295 |

What is claimed is:

1. An improved process for forming a neutralized sulfonated polymer having a hydrocarbon backbone from an acid form of the sulfonated polymer having about 0.2 to about 25 mole percent SO$_3$H groups, wherein the improvement comprises the following steps:
  a. adding a first neutralizing agent to said acid form of said sulfonated polymer to neutralize at least about 50% of said SO$_3$H groups, said first neutralizing agent being selected from the group consisting essentially of Groups I-A, II-A, II-B, III-A, IV-A or ammonium derivatives of fatty acids, to form a mixture of a partially neutralized sulfonated polymer and said fatty acid formed from said derivative of said fatty acid; and
  b. adding a second neutralizing agent to form a metallic salt of said fatty acid, said metallic salt of said fatty acid having a higher melting point than said fatty acid and further neutralizing said SO$_3$H groups of said partially neutralized sulfonated polymer to at least about 95%, said second neutralizing agent being selected from about consisting essentially of hydroxides, lower alkoxides, and lower alkonoates of Group I-A, II-A and II-B metals, at least 25% of the fatty acid being converted into the higher melting salt.

2. An improved process according to claim 1 wherein said hydrocarbon backbone is elastomeric being selected from the group consisting of butyl rubber, polybutadiene, or ethylene propylene terpolymers.

3. An improved process according to claim 1 wherein said neutralized sulfonated polymer contains a minor amount of carboxylic acid unsaturated monomers.

4. An improved process according to claim 1 wherein said hydrocarbon polymer comprises a plastic backbone.

5. An improved process according to claim 4 wherein said plastic backbone is selected from the group consisting essentially of polystyrene, polyethylene, or polypropylene.

6. An improved process according to claim 1 wherein said fatty acid has from 10 to 30 carbon atoms.

7. An improved process according to claim 1 wherein said second neutralizing agent is a hydroxide.

8. An improved process according to claim 7 wherein said hydroxide is magnesium hydroxide.

9. An improved process according to claim 1 wherein the first neutralizing agent is combined with said sulfonated polymer at a level of from 0.5 to 5 equivalents per equivalent of acid groups.

10. An improved process according to claim 9 wherein the second neutralizating agent is combined with said sulfonated polymer at from 0.25 to 3 equivalent per equivalent of acid groups.

11. An improved process according to claim 1 wherein said sulfonated polymer is a sulfonated polystyrene.

12. An improved process according to claim 1 wherein said sulfonated polymer is sulfonated ethylene-propylene terpolymer.

13. An improved process for forming a neutralized sulfonated polymer having a hydrocarbon backbone from an acid form of the sulfonated polymer having about 0.2 to about 25 mole percent SO$_3$H groups, wherein the improvement comprises the following steps:
  a. adding a first neutralizing agent to said acid form of said sulfonated polymer to neutralize at least about 50% of said SO$_3$H groups, said first neutralizing agent being selected from the group consisting essentially of Groups I-A, II-A, II-B, III-A, IV-A or ammonium derivatives of carboxylic acid having about 1 to about 3 carbon atoms, a metallic hydroxide of Group I-A, II-A and II-B metals, a lower alkanoate of Group I-A, II-A and II-B metals, to form a mixture of said partially neutralized sulfonated polymer and a chemical species being selected from the group consisting essentially of water, lower alcohols, carboxylic acids, or lower esters;
  b. adding a preferential plasticizer to said partially neutralized sulfonated polymer, said preferential plasticizer being a fatty acid; and
  c. adding a second neutralizing agent to form a metallic salt of said fatty acid, said metallic salt having a higher melting point than said fatty acid and further neutralizing said SO$_3$H groups of said polymer to about at least 95%, said second neutralizing agent being selected from the group consisting essentially of hydroxides, lower alkoxides, and lower alkanoates of Group I-A, and II-A and II-B metals at least 25% of the fattyacid being converted into the higher melting salt.

14. An improved process according to claim 13 wherein said hydrocarbon backbone is elastomeric being selected from the group consisting of butyl rubber, polybutadiene and ethylene-propylene terpolymers.

15. An improved process according to claim 13 wherein said hydrocarbon backbone comprises a plastic backbone.

16. An improved process according to claim 13 wherein said neutralized sulfonated polymer contains a minor amount of carboxylic acid unsaturated monomer.

17. An improved process according to claim 16 wherein said plastic backbone is selected from the group consisting of polystyrene, polyethylene and polypropylene.

18. An improved process according to claim 13 wherein said fatty acid has from 10 to 30 carbon atoms.

19. An improved process according to claim 13 wherein said second neutralization agent is a hydroxide.

20. An improved process according to claim 19 wherein said second neutralization agent is magnesium hydroxide.

21. An improved process according to claim 13 wherein the first neutralizing agent is combined with said sulfonated polymer at a level of from 0.5 to 5 equivalents per equivalent of acid groups.

22. An improved process according to claim 21 wherein said second neutralizing agent is combined with said sulfonated polymer at from 0.25 to 3 equivalent per equivalent of acid groups.

23. An improved process according to claim 13 wherein said sulfonated polymer is a sulfonated polystryene.

24. An improved process according to claim 13 wherein said sulfonated polymer is sulfonated ethylene-propylene terpolymer.

25. An improved process according to claim 13 wherein the anion of the second neutralization agent is volatilized off from said mixture.

* * * * *